United States Patent
Rao

(10) Patent No.: US 8,166,422 B2
(45) Date of Patent: Apr. 24, 2012

(54) SYSTEM AND METHOD FOR ARRANGING AND PLAYING A MEDIA PRESENTATION

(75) Inventor: Sumita Rao, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1017 days.

(21) Appl. No.: 10/719,317

(22) Filed: Nov. 21, 2003

(65) Prior Publication Data

US 2005/0114800 A1 May 26, 2005

(51) Int. Cl.
*G06F 3/048* (2006.01)
(52) U.S. Cl. .......... 715/867; 715/744; 711/171
(58) Field of Classification Search .......... 715/867, 715/844, 744; 455/66.1; 711/171
See application file for complete search history.

(56) References Cited

U.S. PATENT DOCUMENTS

| | | | | |
|---|---|---|---|---|
| 4,722,005 A | * | 1/1988 | Ledenbach | 348/173 |
| 5,479,476 A | * | 12/1995 | Finke-Anlauff | 455/566 |
| 5,479,656 A | * | 12/1995 | Rawlings, III | 1/1 |
| 5,521,896 A | * | 5/1996 | Bajorek et al. | 369/53.18 |
| 5,680,535 A | * | 10/1997 | Harbin et al. | 345/473 |
| 5,740,435 A | * | 4/1998 | Yamamoto et al. | 1/1 |
| 5,748,190 A | * | 5/1998 | Kjorsvik | 715/867 |
| 5,812,937 A | * | 9/1998 | Takahisa et al. | 455/66.1 |
| 5,819,284 A | * | 10/1998 | Farber et al. | 709/203 |
| 5,819,290 A | * | 10/1998 | Fujita | 711/100 |
| 5,861,881 A | * | 1/1999 | Freeman et al. | 715/201 |
| 5,870,683 A | * | 2/1999 | Wells et al. | 455/566 |
| 5,905,492 A | * | 5/1999 | Straub et al. | 715/744 |
| 5,905,988 A | * | 5/1999 | Schwartz et al. | 707/104.1 |
| 5,907,604 A | * | 5/1999 | Hsu | 379/142.06 |
| 5,913,040 A | * | 6/1999 | Rakavy et al. | 709/232 |
| 5,930,501 A | * | 7/1999 | Neil | 713/400 |
| 5,959,627 A | * | 9/1999 | Duwaer et al. | 715/797 |
| 5,974,558 A | * | 10/1999 | Cortopassi et al. | 713/323 |
| 5,978,566 A | * | 11/1999 | Plank et al. | 709/206 |
| 5,983,073 A | * | 11/1999 | Ditzik | 455/11.1 |
| 6,009,333 A | * | 12/1999 | Chaco | 455/456.5 |
| 6,091,411 A | * | 7/2000 | Straub et al. | 715/747 |
| 6,094,671 A | * | 7/2000 | Chase et al. | 709/201 |
| 6,112,225 A | * | 8/2000 | Kraft et al. | 709/202 |
| 6,185,339 B1 | * | 2/2001 | Ozaki | 382/232 |
| 6,209,011 B1 | * | 3/2001 | Vong et al. | 708/112 |

(Continued)

FOREIGN PATENT DOCUMENTS

EP 1 424 839 A1 6/2004

(Continued)

OTHER PUBLICATIONS

"GraFX Saver Pro," http://web.archive.org/web/20020823011437/www.cdhnow.com/gs.html, CDH Productions, Aug. 23, 2002, pp. 1-2.*

(Continued)

*Primary Examiner* — Weilun Lo
*Assistant Examiner* — Eric Wiener

(57) ABSTRACT

The system enables a user to select and order media objects, such as sound files, image files, animations, and text into a media presentation. The media presentation is then associated with a trigger or other interrupt event. Upon an occurrence of the event, the system plays the media presentation on system output devices. In one example of the system, the selected media files, ordering information, and other properties are assembled into a media package. The media package may be published to a remote device so that a remote device may play the media presentation.

20 Claims, 7 Drawing Sheets

U.S. PATENT DOCUMENTS

| | | | | |
|---|---|---|---|---|
| 6,219,694 | B1 * | 4/2001 | Lazaridis et al. | 709/206 |
| 6,243,725 | B1 * | 6/2001 | Hempleman et al. | 715/210 |
| 6,317,593 | B1 * | 11/2001 | Vossler | 455/414.1 |
| 6,323,775 | B1 * | 11/2001 | Hansson | 340/636.1 |
| 6,353,449 | B1 * | 3/2002 | Gregg et al. | 715/762 |
| 6,360,101 | B1 * | 3/2002 | Irvin | 455/456.6 |
| 6,418,329 | B1 * | 7/2002 | Furuya | 455/566 |
| 6,421,235 | B2 * | 7/2002 | Ditzik | 361/683 |
| 6,493,743 | B2 * | 12/2002 | Suzuki | 709/203 |
| 6,507,351 | B1 * | 1/2003 | Bixler | 715/810 |
| 6,590,590 | B1 * | 7/2003 | Wen et al. | 715/764 |
| 6,683,605 | B1 * | 1/2004 | Bi et al. | 345/211 |
| 6,687,608 | B2 * | 2/2004 | Sugimoto et al. | 701/207 |
| 6,694,418 | B2 * | 2/2004 | Schelling et al. | 711/171 |
| 6,763,272 | B2 * | 7/2004 | Knepper | 700/65 |
| 6,769,120 | B1 * | 7/2004 | Rodriguez | 718/100 |
| 6,810,115 | B2 * | 10/2004 | Fukuda | 379/142.01 |
| 6,831,444 | B2 * | 12/2004 | Kobayashi et al. | 320/136 |
| 6,831,970 | B1 * | 12/2004 | Awada et al. | 379/201.01 |
| 6,909,878 | B2 * | 6/2005 | Haller et al. | 455/41.3 |
| 6,920,606 | B1 * | 7/2005 | Jablonski et al. | 715/202 |
| 6,928,300 | B1 * | 8/2005 | Skinner et al. | 455/556.2 |
| 6,943,693 | B2 * | 9/2005 | Kim | 340/636.1 |
| 6,957,398 | B1 * | 10/2005 | Nayeri | 715/867 |
| 6,961,859 | B2 * | 11/2005 | Derocher et al. | 713/320 |
| 7,039,784 | B1 * | 5/2006 | Chen et al. | 711/170 |
| 7,072,683 | B2 * | 7/2006 | King et al. | 455/550.1 |
| 7,113,809 | B2 * | 9/2006 | Noesgaard et al. | 455/566 |
| 7,123,696 | B2 * | 10/2006 | Lowe | 379/88.16 |
| 7,143,433 | B1 * | 11/2006 | Duan et al. | 725/115 |
| 7,162,263 | B2 * | 1/2007 | King et al. | 455/550.1 |
| 7,228,341 | B2 * | 6/2007 | Giacalone, Jr. | 709/218 |
| 7,231,198 | B2 * | 6/2007 | Loughran | 455/343.2 |
| 7,286,856 | B2 * | 10/2007 | Miwa | 455/566 |
| 7,301,451 | B2 * | 11/2007 | Hastings | 340/539.12 |
| 7,315,882 | B1 * | 1/2008 | Koch | 709/206 |
| 7,362,854 | B2 * | 4/2008 | Mcknight | 379/210.01 |
| 7,386,588 | B2 * | 6/2008 | Mousseau et al. | 709/205 |
| 7,395,097 | B2 * | 7/2008 | Perdomo et al. | 455/574 |
| 7,400,229 | B2 * | 7/2008 | Boss et al. | 340/309.16 |
| 7,430,675 | B2 * | 9/2008 | Lee | 713/320 |
| 7,458,080 | B2 * | 11/2008 | Parker et al. | 719/318 |
| 7,496,352 | B2 * | 2/2009 | Kaminsky et al. | 455/412.2 |
| 7,500,198 | B2 * | 3/2009 | Mathews et al. | 715/744 |
| 7,502,634 | B2 * | 3/2009 | Chi | 455/566 |
| 7,533,104 | B2 * | 5/2009 | Hirose et al. | 1/1 |
| 7,595,717 | B2 * | 9/2009 | Boss et al. | 340/309.16 |
| 7,606,584 | B2 * | 10/2009 | Wang | 455/456.3 |
| 2001/0049275 | A1 * | 12/2001 | Pierry et al. | 455/414 |
| 2001/0049778 | A1 * | 12/2001 | Van Der Vleuten et al. | 711/170 |
| 2002/0023274 | A1 * | 2/2002 | Giacalone, Jr. | 725/146 |
| 2002/0055373 | A1 * | 5/2002 | King et al. | 455/566 |
| 2002/0055986 | A1 * | 5/2002 | King et al. | 709/219 |
| 2002/0055992 | A1 * | 5/2002 | King et al. | 709/221 |
| 2002/0138772 | A1 * | 9/2002 | Crawford et al. | 713/300 |
| 2002/0152193 | A1 * | 10/2002 | Thompson et al. | 707/1 |
| 2002/0194285 | A1 * | 12/2002 | Mousseau et al. | 709/206 |
| 2003/0035529 | A1 * | 2/2003 | Baker | 379/211.02 |
| 2003/0169306 | A1 * | 9/2003 | Makipaa et al. | 345/864 |
| 2004/0002943 | A1 * | 1/2004 | Merrill et al. | 707/1 |
| 2004/0116155 | A1 * | 6/2004 | Aisenberg | 455/558 |
| 2004/0185877 | A1 * | 9/2004 | Asthana et al. | 455/456.6 |
| 2005/0005043 | A1 * | 1/2005 | Gravina et al. | 710/73 |
| 2005/0060238 | A1 * | 3/2005 | Gravina et al. | 705/26 |
| 2008/0045216 | A1 * | 2/2008 | Mousseau et al. | 455/435.3 |

FOREIGN PATENT DOCUMENTS

EP      1424839  A1 *  6/2004

OTHER PUBLICATIONS

"How to write a 32bit screen saver," http://www.wischik.com/scr/howtoscr.html, Lucian Wischik, Jul. 2000, pp. 1-31.*

* cited by examiner

SYSTEM AND METHOD FOR ARRANGING AND PLAYING A MEDIA PRESENTATION

This application is related to U.S. patent application Ser. No. 10/713,319, filed Nov. 14, 2003, and entitled "A System and Method for Sequencing Media Objects", which is incorporated herein by reference.

BACKGROUND

The field of the present invention is the presentation of media objects, for example, images or sounds. More particularly, the present invention relates to presenting media objects using an embedded processor system.

Many electronic devices use embedded processors. For example mobile electronic devices often include embedded processors, microprocessors, or other controllers for controlling the device and providing an interface to a user. More specifically, devices such as mobile wireless phones, personal data assistants, MP3 players, and cameras generally include embedded processors for monitoring, operating, and using these devices. Also, many consumer devices such as DVD players, CD players, stereo equipment, appliances, and motor vehicles include embedded operational controllers. These embedded controllers typically have limited processing capability, and their processing capability is preferably prioritized towards operation and monitoring functions, instead of using excessive processing power and memory to provide a complex user interface. These devices also may have limited memory, such as RAM memory, to keep costs down. In this way, the embedded processor's limited memory, limited processor power, and simple structure cooperate to make cost sensitive and reliable devices.

These embedded systems often require or benefit from a visual display to a user, and often have other presentation devices such as a speaker, LED panels, or other media presentation components. For example, a mobile phone may have a graphical user interface displayed on an LCD screen for providing a man-machine interface. The mobile phone may also enhance the user experience by permitting the user to view an image, listen to a favorite song, or watch a movie trailer. The processor in the mobile phone is responsible for call processing, diagnostics, and support applications, so only limited processor power is generally available to operate and manage the user interface or other graphical processes. Consumers, however, are demanding more interesting and more useful interaction with their electronic devices. In one example, consumers desire a media aspect to the user interface by using sound, images, graphics, animations, or movies.

A typical device that uses an embedded system has limited RAM memory and a relatively simple processor structure. Accordingly, the device may provide only a limited media experience, for example, by allowing for the display of only short animation segments or simple screensavers. Longer media presentations may consume too much processing power and memory, and divert a substantial amount of the device's limited resources into managing and playing a media presentation. In such a case, the device may fail to respond to a time-critical event, such as receiving a wireless telephone call, because the device has dedicated too much memory or processor time to the media presentation. But, an increase in power or memory would increase the complexity and cost for the embedded system and the device. Despite these limitations, consumers are demanding more interesting, active, and helpful user interfaces, and longer media presentations could assist in making more useful and aesthetically pleasing displays.

Also, consumers desire electronic devices that can be customized and tailored to a user's particular preferences. For example, mobile phones often provide for changeable faceplates that allow a user to select a housing color, aesthetic style, or message. In another example, many portable devices allow the user to specify the "wake-up" screen to the device. In this way, the device "greets" the user with a message particular to that user. A typical customized screen may show the user the local weather, or may present the latest box scores for the user's favorite team. Accordingly, there is a need for providing a customizable system and method that enables the sequencing and presentation of media objects on embedded systems, particularly where the embedded system has limited memory and processor capability.

SUMMARY

Briefly, the present invention provides a method and system for arranging and playing media objects in a media presentation. The system enables a user to select and order media objects, such as sound files, image files, animations, and text into a media presentation. The media presentation is then associated with a trigger or other interrupt event. Upon an occurrence of the event, the system plays the media presentation on the system's output devices. In one example of the system, the selected media files, ordering information, and other properties are assembled into a media package. The media package may be published to a remote device so that a remote device may play the media presentation.

In a preferred example, the method is operated on a mobile wireless phone. A user selects a sequence of images from an image file stored on the phone. The user places the images into a desired order, and in some cases may be enabled to specify, for example, durations, timings, and transitions for the selected images. Depending on specific configurations, the user may also specify and sequence other media objects, such as sound files, text, or animations. The selected and ordered images (and other media objects if selected) are stored as a screensaver file. The screensaver file is associated with a screensaver event on the phone, which typically is set to trigger after a predetermined duration of inactivity. The phone then monitors for the screensaver event, and upon its occurrence, plays the customized screensaver.

Advantageously, the described system and method enables a user to dynamically arrange customized media presentations on relatively simple devices, such as wireless phones. In this way, the user is able to customize the device according to the user's personal tastes. For example, the user may configure custom multimedia presentations as personalized screensavers or ring notifications. These custom presentations provide a level of sophistication and professionalism not available on typical known portable devices, and may even combine different types of media into a dramatic multimedia presentation. The system and method operates on relatively simple processor structures and in devices with limited memory resources. In this way, the present system and method may be implemented without substantial added expense or complexity.

DETAILED DESCRIPTION

Figure 1:
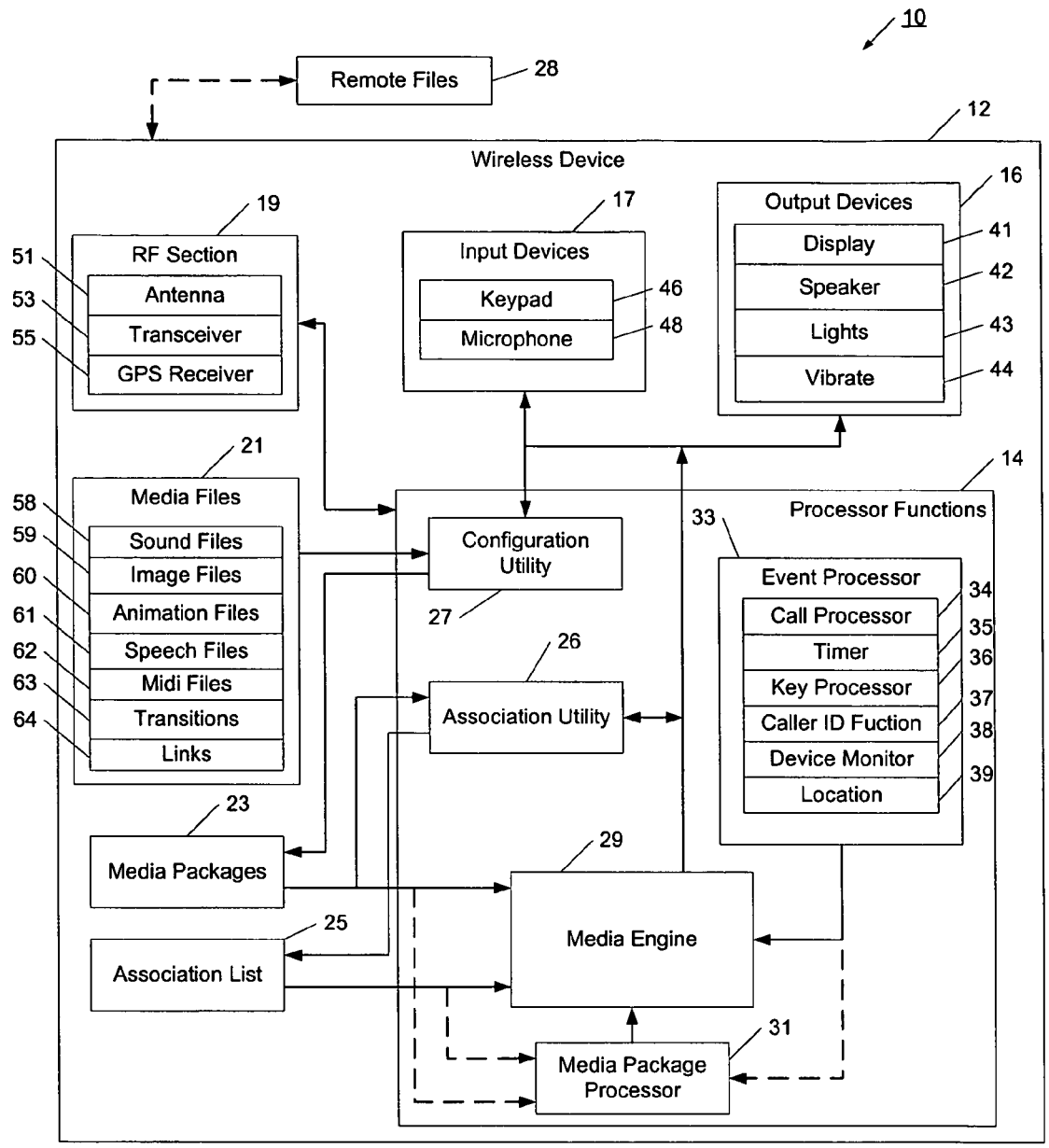
FIG. 1 is a block diagram of a wireless device arranging and playing a media presentation in accordance with the present invention.

Referring now to FIG. 1, a system and method for arranging and playing a media presentation is illustrated. System 10 illustrates an example construction using a wireless communication device 12. Although FIG. 1 illustrates a wireless device 12, it will be understood that the method of system 10 may be advantageously used on many other types of devices. For example, the method of system 10 may be used in devices having embedded controllers, such as personal data assistants, MP3 players, DVD/CD players, appliances, cars, cameras, or other consumer devices.

Generally, system 10 enables a consumer to use the simple wireless device 12 to dynamically arrange or configure a custom media presentation. The custom media presentation is associated with some event trigger on the device 12, and when that event occurs, the device plays the media presentation. For example, a user may define a custom screensaver that includes personal image files, favorite sounds, and custom text. The media presentation may be associated with a screensaver trigger on the wireless device 12. When the wireless device indicates the screensaver should be played, the custom media presentation is played as the screensaver. In this way users may personalize and customize their wireless device to make the device easier to use, more interesting, and more aesthetically pleasing.

Wireless device 12 includes input devices 17 such as a keypad 46 and a microphone 48. The keypad may include a ten-key input for numbers, toggle switches, rotary knobs, and other buttons and input components. The wireless device 12 may also include other input devices such as bar code readers and portable keyboards. The wireless device also has output devices 16. Typical output devices for wireless device include a graphical display 41, which may be in the form of a black and white or color LCD display. The wireless device 12 also typically has one or more speakers 42. The speakers are constructed to enable a user to hear a telephone call, hear a ring tone, and possibly hear communications to facilitate use as a speaker phone. It will be appreciated that one speaker may be arranged for all these functions, or the wireless device may have multiple speakers. The wireless device 12 also may have other lights 43 useful for indicating status of the wireless device and for illumination purposes. The wireless device may also have a vibrator 44 for shaking the wireless device to notify a user of an incoming call when a ring tone is not desired.

The wireless device also has an RF section 19 that would include an antenna 51, a transceiver 53, and may include a GPS receiver 55 for determining location position. It will be appreciated that the general construction of a wireless device, including its RF section, input devices, output devices, is well known and therefore will not be described in detail. The RF section 19, input devices 17, and output devices 16, all couple to a processor 14. It will be understood that the processor 14 may be in the form of a single processor, or may be constructed as multiple interconnected processors. It will also be understood that the processor may be in the form of a microprocessor, computer chip, gate array, PLD, or other logic device. Processor 14, may be in one example, an embedded processor having a relatively simple structure and limited RAM memory. The processor 14 implements several functions for the wireless device, and those functions may be performed in hardware, in firmware, in application software, or a combination of the above. Wireless device 12 also includes other components which are not shown, such as a battery power source and a housing.

The processor 14 functions to provide a user interface for the user of the wireless device. This user interface generally accepts inputs from the keypad 46 and other input devices 17, and displays instructions, status, and other information to the user on the output devices 16 such as display 41. As part of the user interface, the processor 14 implements a configuration utility 27. Configuration utility 27 enables a user to select and order multimedia files into a presentation. Media files 21 may be accessed by the configuration utility 27 and a list of available files is displayed to the user. Media files 21 may be stored locally on the wireless device, on an expansion memory card on the wireless device, or may be on a server which can be accessed wirelessly. The media files 21 may include sound files 58, image files 59, animation files 60, synthesized speech files 61, and Midi files 62.

The media files may also include links 64 which could provide links to remote servers for identifying additional remote media files 28. Media files 21 may also include transitions 63. A transition is used to provide a smooth change when initiating a media file, ending a media file, or changing media files. For example, a transition may allow an image to slowly fade onto the screen or fade gently from the user's view. Such transitions give a more finished and professional appearance to media presentations on a device.

Using the configuration utility 27, the user selects a series of media files for a media presentation. For example, the user may select a series of personal images and a favorite music clip. The user would then use the configuration utility 27 to order the images into a proper sequence, and set the start event and duration for the music clip. The configuration utility 27 then generates a media package 23. The media package 23 has information sufficient to enable the wireless device to play the media presentation, including media file information, ordering information, and timing information.

After the media package 23 has been generated, an association utility 26 may be used to associate the media package with a trigger event on the wireless device. In one example, the association utility is also part of the user interface for the wireless device 12, thereby enabling a user to associate a specific media package with a particular trigger event. For example, the user may associate a particular media package with a screensaver event, and may associate another media package with a "call received" trigger event. It will also be understood that the configuration utility 27 may be automated by the wireless device, such that the wireless device automatically detects and associates a media package with a particular trigger event. After the association utility 26 makes an association, the association between an event and a media file is stored in an association list 25. It will be appreciated that other methods may be used for storing and tracking associations.

The association utility 26 may be able to associate media packages with several different types of trigger events. For example, a wireless device may have a call processor event 34 that provides triggers for when a call is received, a call is disconnected, or a call is dropped. Further, the call processor may provide indications or triggers regarding whether a voice call, paging call, SMS message, or text message is received. A timer 35 may also generate a trigger. For example, after a period of no user activity, a wireless device often provides a screensaver trigger to cause a screensaver to be shown on the LCD screen. The screensaver not only provides an aesthetic appeal to the wireless device, it also protects the LCD from suffering a burnout condition. Pressing a key 36 may also generate a trigger event that may be used to load and play a media package. Caller ID function 37 is also available on many wireless devices for providing an indication of the specific caller initiating a voice call.

In another example, a device monitor 38 may be used to set a device trigger. For example, a device trigger may be set for a low battery condition, no carrier received condition, or other status of the wireless device. Finally, many wireless devices have an ability to obtain position location information 39. This position location information may be useful for setting a trigger event. For example, a user may desire that a particular song be played when the user is about to arrive at home. In another example, the location trigger could be set play another song whenever the wireless device receives an indication that a coffee shop is close by. It will be appreciated that many other event triggers may be generated consistent with this disclosure.

After the association utility 26 has been used to associate a particular event or set of trigger events with a media package, the event processor 33 is used to monitor for an occurrence of that event or events. The event processor, upon detecting the associated occurrence, provides an interrupt into the media engine 29. The media engine 29 may recall the association list 25, which includes an identification of which media package should be recalled upon the happening of a particular trigger event. For example, if the timer event 35 provides an interrupt to the media engine 29, the media engine 29 can extract information from the association list 25 regarding which media file is associated to the timer event. The association list 25 may indicate that a particular media package is to be played as a screensaver upon the timer event trigger.

The media engine 29 then extracts the media package from the media package file 23, and presents the media presentation on the display 41, speaker 42, or other output devices used by the media package. In the illustrated example, the media package 23 includes the media object data, so the media engine is able to play the media presentation without accessing the media file 21. In an alternative implementation, the media package provides a reference link to the media objects, and the media engine accesses the needed media objects from media file 21. It will be understood that the media package and media objects may be stored locally on the phone in a format that can be immediately used by the media engine 29, or a media package processor 31 may be used to further process the media package and media objects for use by the media engine 29. For example, one or more of the individual media objects may be too large to be efficiently used by the media engine. Accordingly, the media package processor 31 may be used to divide the large media object into a series of sequential segments or subsets that can be easily accommodated by the media engine 29.

Figure 2:
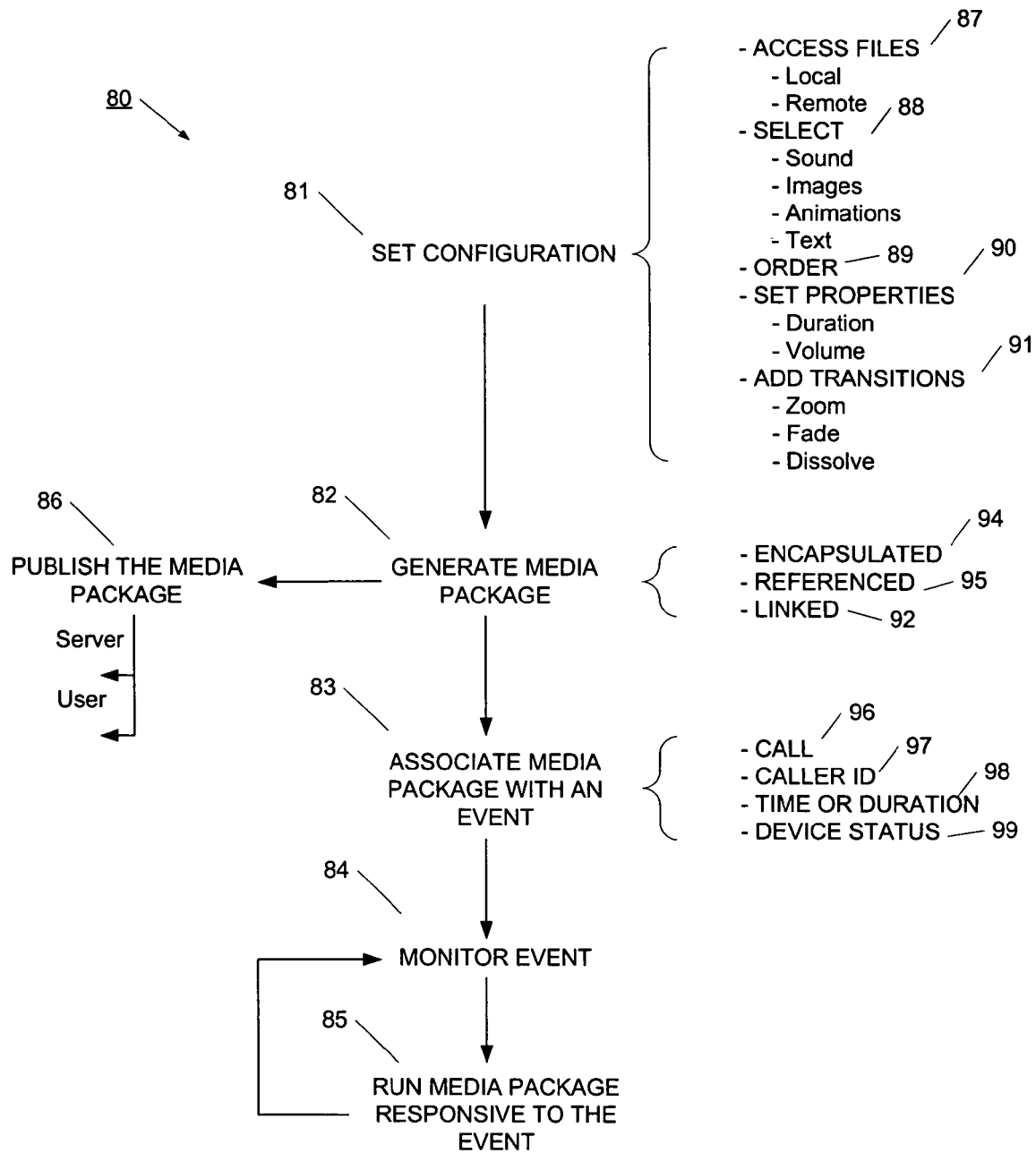
FIG. 2 is a flowchart of a method of arranging and playing a media presentation in accordance with the present invention.

Referring now to FIG. 2, a flowchart of a method of arranging and playing a media presentation is illustrated. Method 80 begins by allowing a user to set configuration 81 of a media presentation. In setting a configuration, the user accesses files 87 either on a local device or on a remote server. The local files may be stored in local memory, or may be stored on a removable memory card, for example. The media objects may be image files, animations, sound files, Midi music files, text files, artificial speech files, or other types of media objects. The user then selects 88 a set of sound, image, animation, or other media objects to be used as part of the media presentation. The user may then specify an order 89 for the selected media objects. In one example, each of the media objects may be played sequentially. In another example, certain of the media objects may be played concurrently with another, such as when the user desires to play a music clip at the same time an image is being displayed. The user then may be able to set certain specific properties 90 for each of the media files. It will be appreciated that each type of media object may have different properties that may be set. For example, a sound file may have a duration property and a volume property, while an image file may have a duration property and a color depth property. The user may also be able to add transitions 91 to the media objects. Transitions may be added at the start of a media object, at the end of a media object, or between media objects. Typical transitions may include zooms, fades, dissolves, louvers, and spins. It will be understood that many other types of transitions may be used.

After the user has set the configuration, a media package is generated 82. The media package may be arranged in optional forms. For example, the media package may be encapsulated 94. An encapsulated media package includes data information for each of the media objects selected, plus the necessary ordering, sequencing, and timing information. In this way, an encapsulated media package is self-contained with the information necessary for the media engine to present the media presentation. In one example, encapsulated media package may be published 86. The encapsulated media package may be published to a server where other users may access and download the media package, or it may be transmitted directly to another user. In this way, the remote user may be enabled to associate the encapsulated media package with a particular trigger event, and have the media presentation played on the remote user's device.

The media package may also be referenced 95. A referenced media package does not contain all the media data information, but instead provides directory or file links to where the media files may be located. For example, a referenced media package may include a directory name, a file name, or a server name where a specific image object could be located. In this way, media files may be reused by many media packages, thereby saving memory space. Media packages may also automatically link media objects, or if individual media objects are too large, then link smaller segments together to form the whole media objects. Using a linked media package 92, each media object or segment is associated with sufficient information to cause the media engine to load the next sequential media object. In this way, each of the media objects or segments is linked or chained together. In some configurations, a linked media package provides for a simpler processor structure and memory management.

Once the media package has been generated, the media package may be associated with a particular trigger event 83. For example, the trigger event may be an incoming call 96, a particular caller ID 97, a particular time or duration 98, or a status of the device 99. It will be appreciated that many other trigger events may be used. The device then monitors for the event 84. When the event occurs, the device activates the media engine to play 85 and present the media package. In this way, the presentation is played for the user responsive to a particular trigger event.

Figure 3:
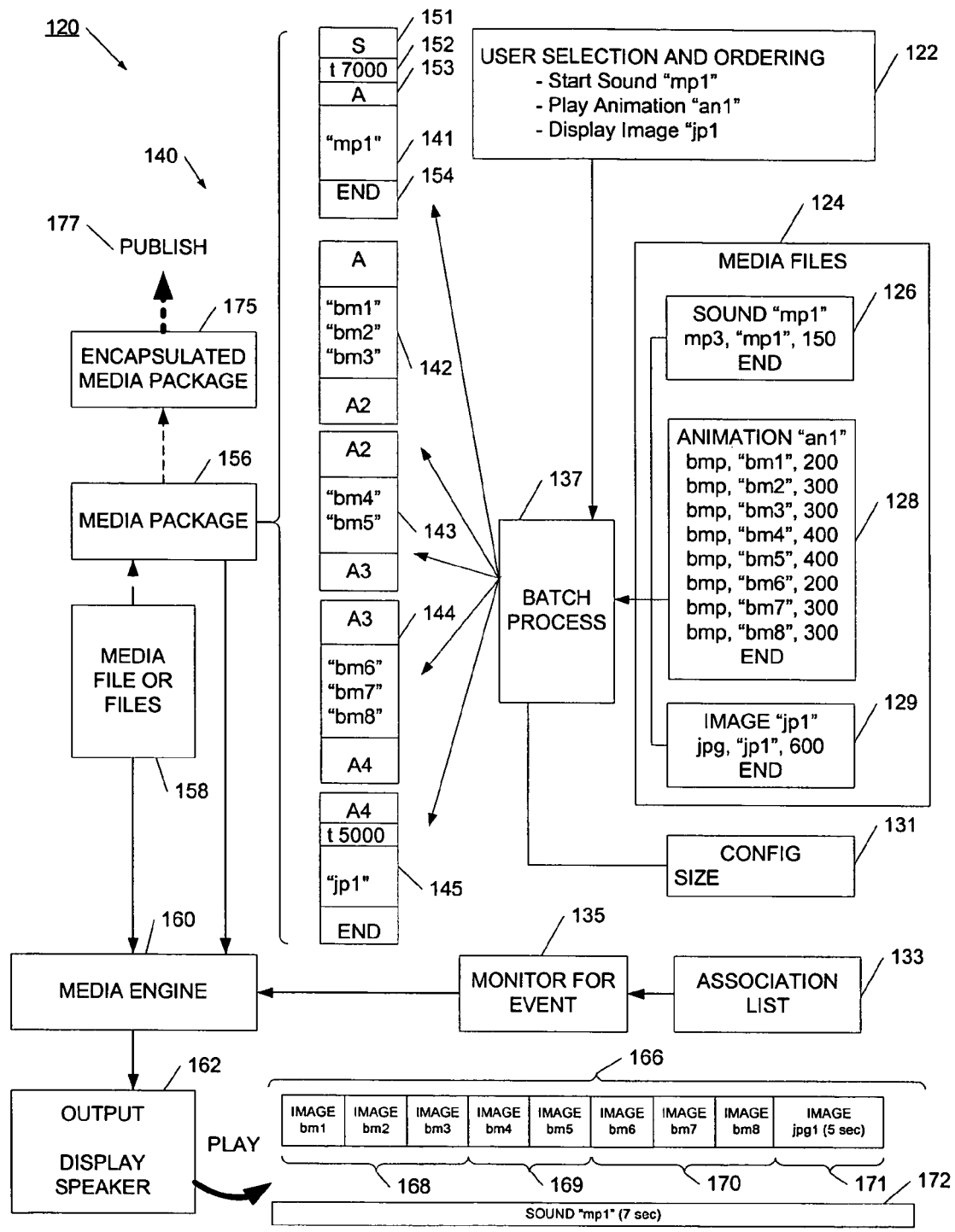
FIG. 3 is a flowchart of method for generating and playing presentation segment files in accordance with the present invention.

Referring now to FIG. 3 a flowchart for method for generating and playing presentation segment files is shown.

Method 120 is particularly useful for embedded systems having a simple structure with limited RAM. Such embedded systems are most efficiently utilized when an entire media segment can be loaded into local RAM prior to presenting the media object. Because embedded processors often have limited RAM, the size and number of sequential media objects may be limited. Therefore, method 120 enables a large media presentation to be segmented into individual segments, with each segment sized to efficiently be loaded into available RAM. Advantageously, long media presentations may then be presented responsive to trigger events. In this way, devices become more friendly, more interesting, and more fun. Further description of generating and sequencing segments is provided in related U.S. patent application Ser. No. 10/713,319, which has been incorporated herein by reference.

The Method 120 starts by having a user select and order media objects to define a media presentation as shown in block 122. In this example, the user desires to start playing the sound "mp1", and then start playing the animation "an1". After the animation is completed, the user then desires to display the image "jp1". The selection and ordering is done as part of a device's user interface, with the information being forwarded into a batch process 137. It will be understood that many alternatives exist for providing an interface to enable a user to select and order media objects. The batch process 137 has access to media files 124, where each of the selected media objects can be found. Each of the media objects, such as the sound 126 "mp1" is in the media file 124 and includes an indication of file format, the file name, and size information. For example, sound 126 is in an MP3 format, the sound data file can be found in a file named "mp1", and the file is 150 units in size. It will be appreciated that the size units may be, for example, in bytes or kilobytes, or may be a relative size indication. In another example, the animation file 128 is shown to include eight sequential image files, each in a bit map format, and between 200 and 400 units in size. Finally, the image 129 is in a JPEG format, and is 600 units is size.

The batch process also has access to configuration information 131, which may include a maximum size for individual presentation segments. The size may be predefined to allow each animation segment to be loaded into memory, or may be determined dynamically dependent on specific device status. Since the batch process 137 knows the number and size of all of the files in the media presentation, and also knows the maximum size from the configuration file 131, the batch process 137 can segment the presentation into a set of sequential segments 140. For example, a very large media object may be divided into smaller sequential subsets, while a sequence of small media objects may be combined into a single segment. In this way, segments are provided that are sized to be particularly efficient for loading into available RAM memory. Each of the segments may also include one or more action commands that provide sequencing, timing, or other presentation information.

In FIG. 3, the max size may be set at 1000. The batch process therefore makes a first presentation segment 141 that includes only the sound file. The sound file is separately segmented since the sound file is going to be played concurrently with showing several image frames. The sound segment 141 includes a file identifier 151, an action command showing that the sound file should be played for 7 seconds (7000 mS) 152, and another action command 153 showing that segment "A" should be immediately loaded and played. Sound segment 141 also shows that the file "mp1" should be loaded. After "mp1" has played, the final action instruction 154 "END", instructs that no additional files should be loaded.

Since the images in the animation file 128 aggregate to a size much larger than the 1000 maximum size, the batch processor 137 segments the animation into three sequential segments 142, 143, and 144. The first segment 142 includes the first three image bitmaps. Since the first three images will each be in memory at the same time that the sound file is included, the fourth bit map cannot be loaded without exceeding the 1000 size limit. In this way, segment 142 is limited to the first three image files. In a similar manner, the second image segment 143 contains only bitmaps 4 and 5. And finally, the third segment 144 includes the final three bitmap images.

Each of the three animation segments includes a file identifier and at least one action instruction. For example, segment 142 is identified as "A", and has an action identifier of "A2". In this way, the segment 142 includes an action instruction for identifying segment "A2" as the next sequential segment. In this way, when segment "A" has played, the media engine is instructed to load and play the segment "A2". In a similar manner, segment 143 includes an action instruction "A3" for providing a callback to "A3" as the next animation segment, and segment 144 includes a callback instruction of "A4" for calling the "A4" segment 145 when segment "A3" has played. The "A4" segment also includes a first action instruction to show that the image "jp1" should be displayed for 5 seconds, and a final action instruction "END" showing that no more segments are included in the media presentation.

Together, the media segments 140 are combined into a media package 156. In one example, the media package includes the media object data, and therefore becomes an encapsulated media package 175. Such an encapsulated media package 175 could therefore be published 177 to a server or transmitted directly to another user. The other user would thereby be able to play the encapsulated media presentation without having to acquire the media objects from other locations. Alternatively, the media package may include references to the file names, and the media engine 160 can retrieve data for the media objects from a media file or files 158.

Media packages may be associated with specific event triggers for a device. In one example, the association is made dynamically by a user to facilitate further customization options, and in another example, the device may define the association. An association list 133 is used to track the associations between media packages and trigger events. The device monitors for trigger events 135, and when a trigger event occurs, uses the association list 133 to determine which media package to access and play. The media engine thereby retrieves the correct media package for the associated trigger event and accesses media objects from the media file 158. The media engine proceeds to play the media presentation on an output device 162 such as the display and the speaker. When the media engine plays the presentation, the presentation will be shown to the user as a multimedia presentation 166. More particularly, the user will first hear a sound 172 which will continue for 7 seconds. The user then sees animation segments 168, 169, and 170. At the completion of the eight frames of animation, a static image 171 will be shown for 5 seconds. Shortly after the image is complete, the sound 172 will end.

Method 120 enables a user to dynamically configure and arrange media objects into a custom media presentation, and the batch processor divides the media presentation into segments sized to be conveniently loaded into available RAM memory. The media presentation is then associated with a particular trigger event, and upon an occurrence of that event, the media presentation is played. The media presentation may also be provided into a package that can be published for use by a remote user.

Figure 4:
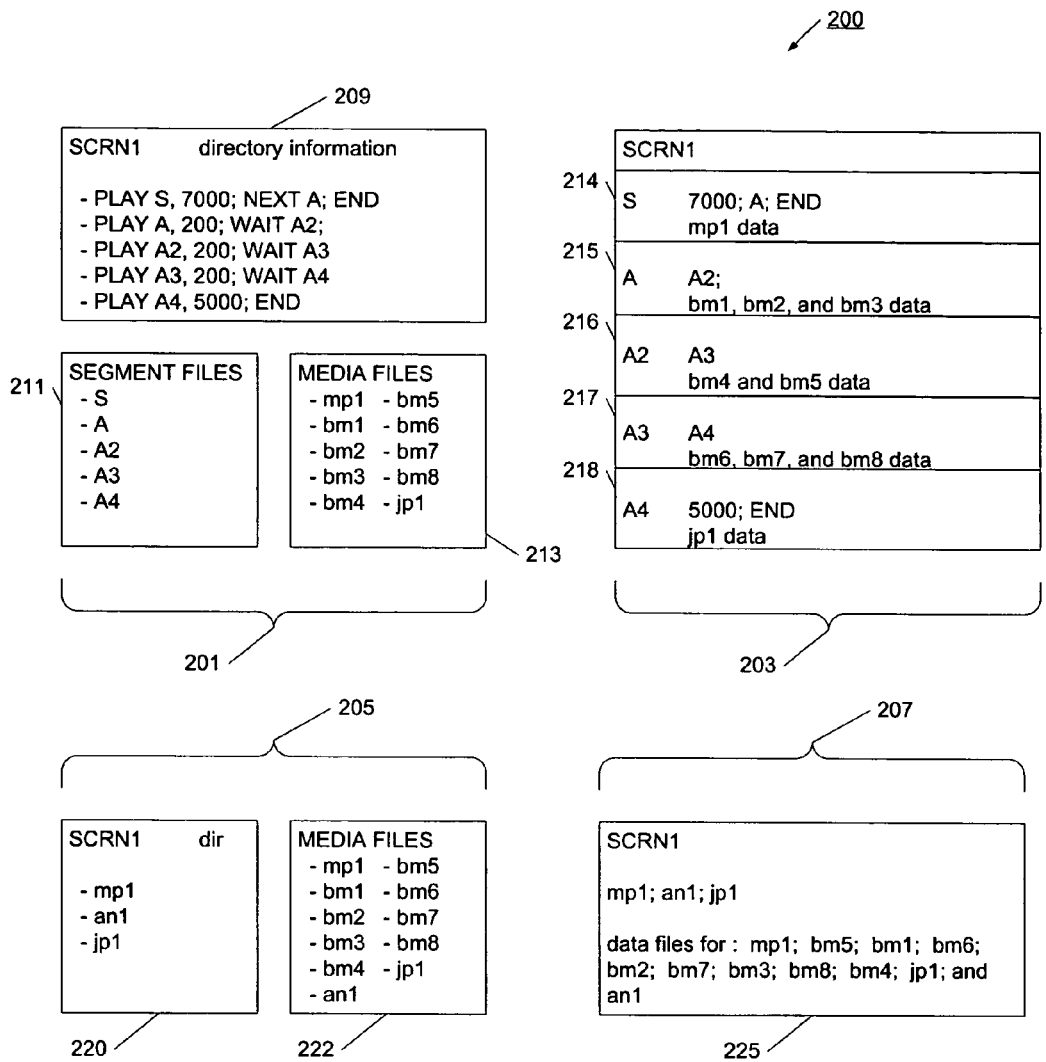
FIG. 4 is a block diagram of example file formats for a media package in accordance with the present invention.

Referring now to FIG. 4, example file formats for media packages are illustrated. A media package generally consists of information sufficient so that a media engine may play several media objects, and includes ordering and sequencing information so the media engine knows how to order, sequence, and time the media objects. In file formats 201 and 203, the file formats use media segments like the media segments generated with reference to FIG. 3.

In file format 201, a media package 209 is illustrated that references presentation segments stored in a directory. Package 209 includes directory information so that the media engine knows what directory, server, or other location to find the individual presentation segments. The package 209 shows that the first sound file "S" plays for 7 seconds and the "A" segment immediately loads and plays. After "S" completes, no more files are loaded responsive to "S". After "S" has been loaded, "A" is loaded and each of its frames displayed for 200 milliseconds, and at the completion of the last image, segment "A2" is loaded. In a similar manner all the images associated with "A2" are played for 200 milliseconds and at the completion of the last image, segment "A3" is loaded. Also, "A3" plays each of its images for 200 milliseconds and at the completion of the last image, presentation segment "A4" is loaded. Segment "A4" plays for 5 seconds, and the media presentation ends. Segment files 211 are located in the directory identified in the package 209 as well as the media file data 213.

File format 203 shows an example of an encapsulated segmented media package. In file format 203, the media package includes a sound segment 214 that includes sequencing and timing information along with sound data. Three animation segments 215, 216, and 217 are also provided, with each having sequencing information and respective image data. The media package also includes an image segment 218 having timing information, sequencing information and image data. In this way encapsulated segmented file format 203 may be transmitted to a server for download to other users, or may be transferred directly to another remote device for presentation. Since the encapsulated file includes all data and information necessary for the presentation, any compatible media engine may play the media presentation. For example, a user may develop a particularly interesting screensaver, and may encapsulate that screensaver in a media package. The user may transmit the screensaver package to a central server, where another user could download that screensaver package and have that screensaver operate on the remote user's device.

In another example of the media package format, a referenced format 205 is shown. The referenced format 205 includes a media package 220 that includes the name of the screensaver and a directory where the data files can be found. In this way, the media package simply identifies the order of the media objects, and alternatively may include additional sequencing and timing information. The media package 220 identifies the directory where all the media files 222 are located. In another example of the file format 207, the media package 225 includes an identification of the order of media objects, and also includes all of the media data in a single file. Again, the encapsulated media package 225 may be packaged for transmission and publication. It will be appreciated that many alternatives exist for formatting and arranging the media package.

Figure 5:
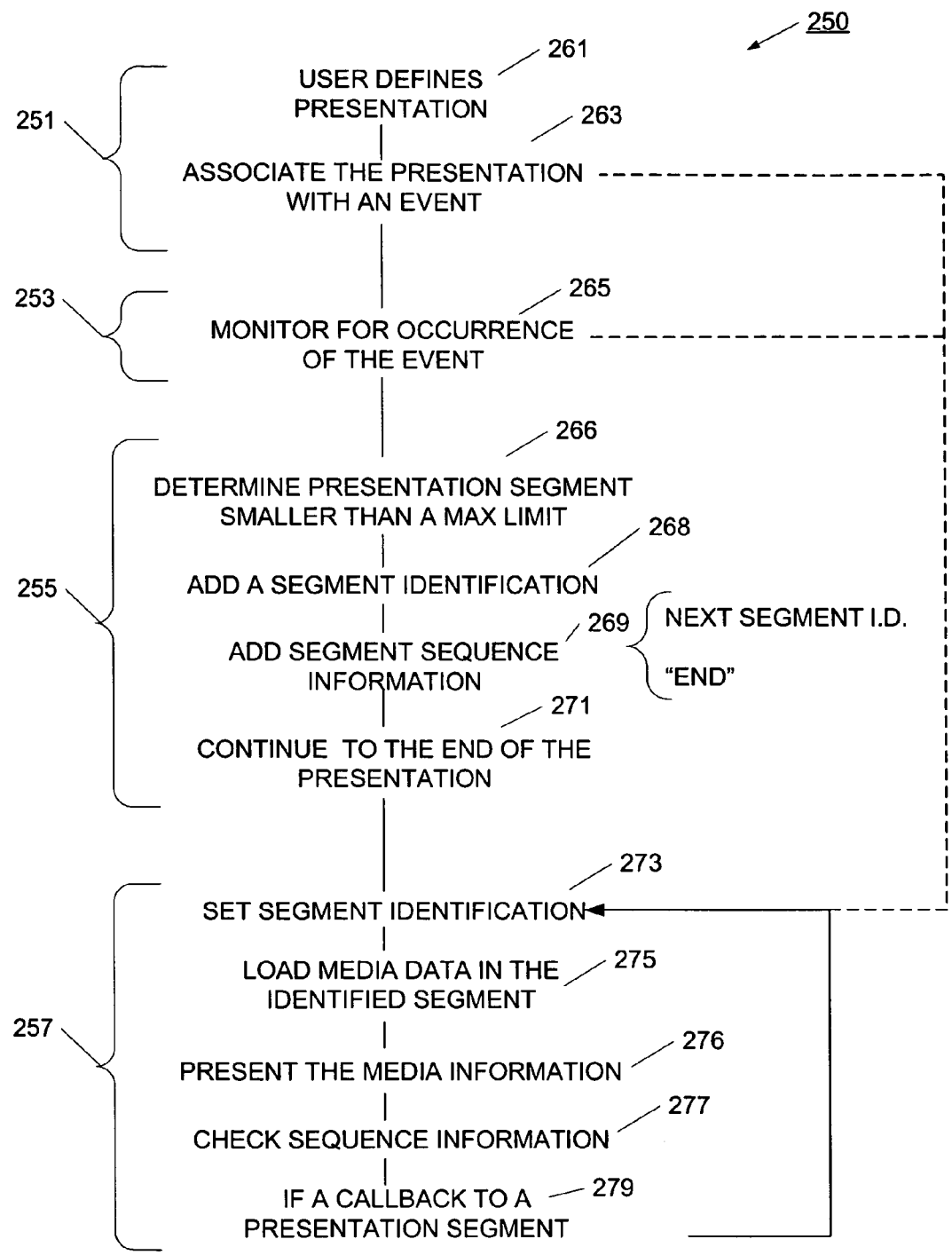
FIG. 5 is a flowchart of a method for arranging and playing a media presentation in accordance with the present invention.

Referring now to FIG. 5 a flowchart of a method for arranging and playing a media presentation is illustrated. More particularly, method 250 illustrates a method for defining a long media presentation, dividing the long media presentation into a series of presentation segments, and then sequentially playing each of the presentation segments responsive to an event trigger. Method 250 is generally divided into a user configuration section 251, a background monitoring section 253, a segment generation section 255, and a segment presentation section 257.

In the configuration segment 251 a user defines the presentation 261 by ordering and selecting media objects. The user may also be able to add and change particular characteristics and properties for each of the media objects. After the media presentation has been generally defined, the media presentation is associated with a particular trigger event 263, such as with an elapsed timer or an interrupt action. The device then enters a monitoring phase 253 where it monitors for the occurrence of the target event 265.

In section 255, the long media presentation is divided into segments that can be more easily loaded into limited RAM of, for example, an embedded processor system. The dividing and segmentation process 255 may occur responsive to the occurrence of the trigger event, or may occur at a different time. For example, the media presentation may be segmented during the time when the processor has additional processing capability, and the prepared segments would therefore be ready for immediate use when the interrupt occurs. In another example, the segmentation process may occur after the event trigger has been received.

In segmenting the long media presentation, a batch processor is used to determine presentation segments that are smaller than a maximum limit 266. The maximum limit is typically set at a size smaller than the amount of available RAM. In this way, an entire media presentation segment can be loaded into RAM at one time. A segment identification 268 is added to each presentation segment. For example, the segment identification may be the file name for holding that presentation segment. Segment sequence information 269 is also added to the presentation segment. For example, the segment sequence information may be in the form of an action command that provides a callback to the next segment in sequence. In this way, each segment links to the next segment in sequence so that the presentation segments are chained together. For the last segment, an action command of "END" may be added as segment sequence information so that the media engine knows that no additional media segments should be loaded. The segmenting process is continued 271 until all segments have been generated.

When the trigger event is detected, the media presentation is then presented or played. The trigger event has been associated with a particular media presentation, and that identification is used to recall the first segment identification in block 273. The first segment is loaded into memory 275 and presented to the user as shown in block 276. For example, if the media segment is a sound file, the sound would play through the speaker, and if the media object is an image, then the image would be displayed on the display screen. The media engine then checks the sequence information 277 in the segment, and if an action command is a call back 279, then the media engine has the file name of the segment to load into memory next. Depending on other action commands and sequencing information contained in the segment, the media engine may immediately load the file and begin playing it concurrently, or may wait until the current media object has finished playing before loading and playing the next object. If the action command is the END command, then the media engine knows that no more media segments are to be played. Method 250 thereby enables the playing of a long media presentation on an embedded system having simple structure and limited RAM. Advantageously, each media segment includes sequencing information so that all the segments are easily linked or chained together. In some constructions, this enables a particularly efficient and simple processor and memory structure.

Figure 6:
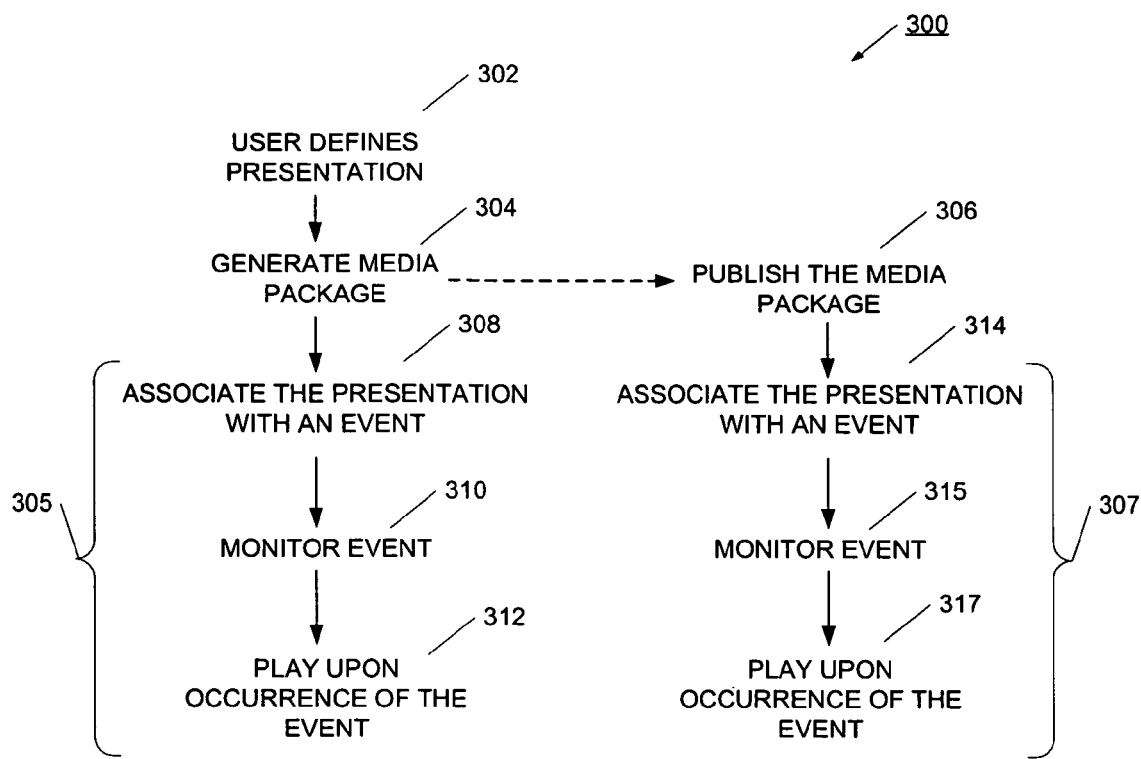
FIG. 6 is a flowchart of a method for arranging and playing a media presentation in accordance with the present invention.

Referring now to FIG. 6 another flow chart for arranging and playing a media presentation is illustrated. Method 300 allows a user to define a presentation 302 by selecting and ordering media objects. Once the objects have been selected and ordered, a media package can be generated as shown in block 304. The media package then may be used locally 305 or may be published 306 to be used remotely 307. If used locally 305, the local user associates the media presentation with a trigger event as shown in block 308. The local device then monitors for that event 310 and upon occurrence of that event 312 the media presentation is played. In this way, the media presentation generated by the local user may be used and presented by the local device. Alternatively, the media package may be published and used by a remote user and device. The remote user 307 would receive the media package, either by downloading from a service or by receiving the media package as, for example an attachment to an SMS message. Once the media package has been received at the remote device, the remote user associates the media package with a trigger event 314, and the remote device monitors for that trigger event as shown in block 315. Upon occurrence of that trigger event 317 the remote device plays and presents the media presentation. In this way, the media presentation generated on a local device may be published to a remote device for use and presentation.

Figure 7:
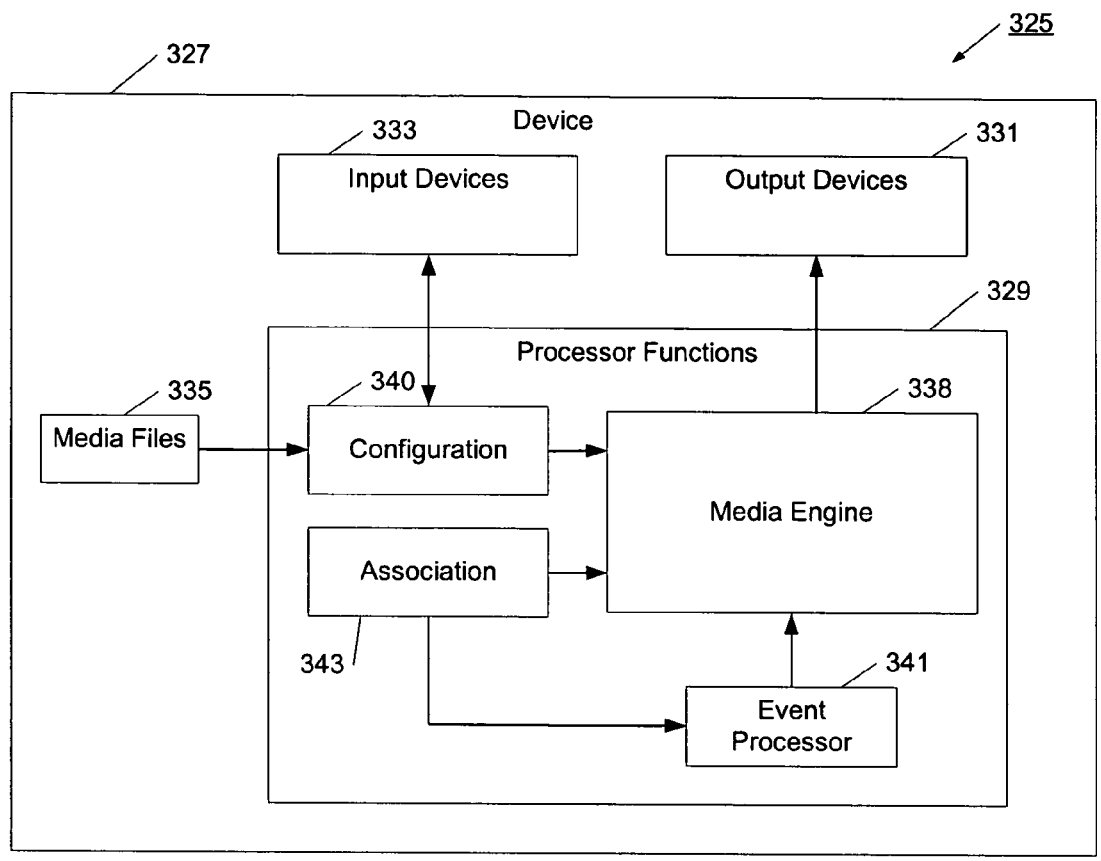
FIG. 7 is a block diagram of a device arranging and playing a media presentation in accordance with the present invention.

Referring now to FIG. 7 a block diagram of another device for arranging and playing a media presentation is illustrated. System 325 includes a device 327, which may be for example, a portable battery powered device for use by a consumer. The device 327 includes input devices 333 allowing the user to provide inputs to the device. Typical input devices may be for example, keyboards, keypads, microphones, and graffiti stylus devices. The device 327 also includes output devices 331. For example output devices may include color or black and white screens, speakers, vibrators, lights, and other indicators. The device 327 has a processor 329 which may be in the form of a single or multi processor configuration. The processor operates a user interface using the input devices 333 and the output devices 331. In one example, the user interface may be a graphical user interface allowing the user to make choices graphically. In another example, the user interface may allow the user to interact with the device by selecting numbers or letters on a keypad, or by toggling various switches. The device 327 also includes media files 335. The media files 335 may be included on local memory, or may be included on removable memory cards. Also, the device 327 may have communication links via wireless connection or Internet connection for accessing servers to find and access additional media files.

The user interface includes a configuration utility 340 enabling the user to select and order a set of media files. For example, the user may select a series of images to be displayed concurrently with the sound. The configuration utility may also enable setting of certain properties and characteristics for each of the individual media objects, or for the media presentation as a whole. In an alternative arrangement, the configuration utility may be a process operating on a different device. For example, the configuration utility may be operated on a computer system having access to a large number of media objects. The configuration is used to select and order these objects, and generates a media package that is arranged for transmission to the device 327. If the computer system has particular information regarding the device 327, the computer may also provide an association list to the device 327 that identifies which event trigger should be associated with the media package.

An association 343 can be made on the local device between the media presentation and a particular trigger event. An event processor 341 monitors for the particular event, and when that event occurs, notifies the media engine 338 that the event has occurred and provides an identification for the media presentation to be played. The media engine 338 recalls the media presentation, and if necessary, recalls the individual media object files, and presents the media presentation using one or more of the output devices 331. Using system 325, a user is able to dynamically construct and configure a media presentation, and associate that media presentation with a particular trigger event. Upon occurrence of the trigger event, the media presentation may be displayed on the local device. If the device 327 includes communication abilities, the media presentation may be published wirelessly or through network connection to a remote device. Provided the remote device has a properly configured media engine, the media presentation may be played remotely.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for arranging and playing a media package on a wireless communication device, comprising:
    providing a plurality of media objects for selection by a user, the plurality of media objects comprising at least one of image files, sound files, animation files, speech files, midi files, transitions, and links;
    receiving configuration instructions from a user, the configuration instructions comprising selecting and ordering a subset of media objects of the plurality of media objects, and specifying specific properties for at least one media object of the selected subset of media objects;
    receiving a user input indicating a user-selected trigger event;
    associating the user-selected trigger event with the selected subset of media objects;
    forming a series of sequential segments, comprising:
    a) dividing a large media object into smaller sequential segments or combining small media objects into a single segment, wherein the dividing and combining is carried out such that each segment is sized to effectively be loaded entirely into available random access memory RAM, based on a segment maximum size derived from a specific status of the wireless communication device,
    b) wherein, when forming the series of sequential segments, a segment identification and at least one action instruction is included into each sequential segment, wherein each action instruction indicates which sequential segment has to be loaded and played next when playing the series of sequential segments,
    c) repeating steps a) and b) for each media object until the series of sequential segments is formed,
    grouping the plurality of sequential segments to form a media package responsive to the configuration instructions from a user;
    monitoring for the user-selected trigger event;
    detecting the user-selected trigger event;

responsive to detecting the user-selected trigger event, playing the media presentation on at least one interface of a plurality of user interfaces of the wireless communication device, wherein the media presentation comprises the media package.

2. The method according to claim 1, further including the steps of:
publishing the media package to a remote device;
associating, on the remote device, the media package with a trigger event;
monitoring for the trigger event on the remote device;
detecting the trigger event on the remote device; and
playing the media package on the remote device, responsive to the trigger event.

3. The method according to claim 2, wherein the media package is published to the remote device through a network connection.

4. The method according to claim 2 wherein the media package is published to the remote device through a wireless connection.

5. The method according to claim 1, wherein the media presentation is played by loading and playing each of the series of sequential segments in sequential order.

6. The method according to claim 1 where at least one of the plurality of media objects is a sound file and at least another one of the plurality of media objects is an image file.

7. The method according to claim 1, wherein the media package is a screensaver for a display device of the wireless communication device, and the media package is played responsive to a timed trigger event associated with a screensaver function.

8. The method according to claim 1, wherein the user-selected trigger event is generated by a position location receiver.

9. The method according to claim 1, wherein the user-selected trigger event is generated by a timer.

10. The method according to claim 1, wherein the user-selected trigger event is generated by a call processor.

11. The method according to claim 1, wherein the user-selected trigger event is generated according to a content of a caller identification information.

12. The method according to claim 1, wherein the media package is a referenced media package which includes file location links to access data for the plurality of media objects.

13. The method according to claim 1, wherein the media package is a linked media package wherein the plurality of media objects comprises the series of sequential segments which directs a media engine to load each next sequential segment.

14. A wireless communication device for arranging and playing a media package, comprising:
a memory storing a plurality of media objects for selection by a user, the plurality of media objects comprising at least one of image files, sound files, animation files, speech files, midi files, transitions, and links;
an output device; and
a processor coupled to the memory and the output device, wherein the processor is configured to,
receive configuration instructions from a user, the configuration instructions comprising selecting and ordering a subset of media objects of the plurality of media objects, and specifying specific properties for at least one media object of the selected subset of media objects;
receive a user input indicating a user-selected trigger event;
associate the user-selected trigger event with the selected subset of media objects;
form a series of sequential segments, wherein forming the series of sequential segments comprises,
a) dividing a large media object into smaller sequential segments or combining small media objects into a single segment, wherein the dividing and combining is carried out such that each segment is sized to effectively be loaded entirely into available random access memory (RAM), based on a segment maximum size derived from a specific status of the wireless communication device,
b) wherein, when forming the series of sequential segments, a segment identification and at least one action instruction is included into each sequential segment, wherein each action instruction indicates which sequential segment has to be loaded and played next when playing the series of sequential segments,
c) repeating steps a) and b) for each media object until the series of sequential segments is formed,
group the plurality of sequential segments to form a media package responsive to the configuration instructions from a user;
monitor for the user-selected trigger event;
detect the user-selected trigger event;
responsive to detecting the user-selected trigger event, play the media presentation on the output device of the wireless communication device, wherein the media presentation comprises the media package.

15. The device according to claim 14, further including the steps of:
publishing the media package to a remote device;
associating, on the remote device, the media package with a trigger event;
monitoring for the trigger event on the remote device;
detecting the trigger event on the remote device; and
playing the media package on the remote device, responsive to the trigger event.

16. The device according to claim 15, wherein the media package is published to the remote device through a network connection.

17. The device according to claim 15 wherein the media package is published to the remote device through a wireless connection.

18. The device according to claim 14, wherein the media presentation is played by loading and playing each of the series of sequential segments in sequential order.

19. The device according to claim 14 where at least one of the plurality of media objects is a sound file and at least another one of the plurality of media objects is an image file.

20. The device according to claim 14, wherein the media package is a screensaver for a display device of the wireless communication device, and the media package is played responsive to a timed trigger event associated with a screensaver function.

* * * * *